(12) United States Patent
Takita

(10) Patent No.: US 6,232,379 B1
(45) Date of Patent: May 15, 2001

(54) OIL-BLEEDING SILICONE RUBBER COMPOSITIONS

(75) Inventor: Kenichi Takita, Usui-gun (JP)

(73) Assignee: Shin-Etsu Chemical Co., Ltd., Tokyo (JP)

(*) Notice: Subject to any disclaimer, the term of this patent is extended or adjusted under 35 U.S.C. 154(b) by 0 days.

(21) Appl. No.: 09/352,938

(22) Filed: Jul. 14, 1999

(30) Foreign Application Priority Data

Jul. 15, 1998 (JP) .................................................. 10-216476

(51) Int. Cl.⁷ ......................................................... C08K 5/54
(52) U.S. Cl. .......................... 524/266; 524/588; 524/493; 524/268
(58) Field of Search ..................................... 524/588, 268, 524/493, 366

(56) References Cited

U.S. PATENT DOCUMENTS

| 4,742,101 | * | 5/1988 | Yoshida | 524/267 |
| 5,240,984 | * | 8/1993 | Takahashi et al. | 524/266 |
| 5,369,161 | * | 11/1994 | Kunieda et al. | 524/266 |
| 5,668,225 | * | 9/1997 | Okazaki et al. | 525/478 |

FOREIGN PATENT DOCUMENTS 6-93186 * 4/1994 (JP) .

* cited by examiner

*Primary Examiner*—Margaret G. Moore
(74) *Attorney, Agent, or Firm*—Millen, White, Zelano & Branigan

(57) ABSTRACT

An oil-bleeding silicone rubber composition comprising (A) an alkenyl-containing organopolysiloxane, (B) finely divided silica, (C) a silicone bleed oil having methyl and phenyl groups attached to substantially all silicon atoms, and (D) another silicone bleed oil. When molded in a mold, the composition satisfies both the requirements of minimized mold contamination and smooth mold release.

18 Claims, 1 Drawing Sheet

OIL-BLEEDING SILICONE RUBBER COMPOSITIONS

This invention relates to oil-bleeding silicone rubber compositions which when molded in molds, exhibit minimized mold staining and smooth mold release.

BACKGROUND OF THE INVENTION

Because of its heat resistance, weather resistance, durability and electrical properties, silicone rubber has been widely employed in a variety of fields as building materials, electric and electronic parts, automotive parts, and business machine parts. Of these, the automotive parts of silicone rubber include oil seals, connector packings and plugs, O-rings, diaphragms, and distributor grommets. Especially for use as grommets in connectors and distributors where ease of assembly, tight seal when mounted, water-proofness, and insulation are of particular concerns, oil-bleeding silicone rubber was found effective because molded parts thereof allow oil to bleed on their surface. In fact, oil-bleeding silicone rubber has been in widespread use. The bleed oils used in the prior art are often silicone oils containing phenyl groups and having a viscosity of 100 to 500 centistokes.

Molded parts of such oil-bleeding silicone rubber can be produced by molding a silicone composition into a desired shape by conventional rubber molding techniques such as compression molding, transfer molding and injection molding, followed by vulcanization and curing in a conventional manner. Many molded parts are of complex shape and of small size. Also in most cases, several tens to several hundreds of parts are made in one molding operation. To increase productivity under the circumstances, it is requisite that molded parts can be readily removed from the mold.

For quick removal from the mold, automatic ejection relying on mechanical forces by ejectors or pneumatic pressure is often used. If a certain force is required for removal because of the close adhesion of a part to the mold, it is necessary to take a longer time than usual for the removal operation. In some cases, removal by mechanical forces is impossible and parts must be manually taken out. This is time consuming and accompanied by the risk of damaging the part or the mold or both. Especially for unmanned operation of an injection molding machine, ease of removal is important. In a single mold capable of simultaneously molding a plurality of parts in one operation, if any of the parts is left affixed in the mold, the machine must be shut down and that part must be manually taken out. This represents a substantial hindrance to productivity.

At the same time, several techniques of applying an abherent to the surface of a mold, coating the surface of a mold, and adding an abherent to a silicone rubber composition are used to reduce the resistance to separation. The oil-bleeding silicone rubber generally has a less resistance to separation because oil bleeds out to the mold surface upon vulcanization and curing. However, in the case of automatic removal of molded parts by means of an ejector, the ejector can slip on the part surface depending on the degree of oil bleeding or penetrates into a recess or aperture in the part, resulting in a failure of removal.

The oil-bleeding silicone rubber has another problem. After the completion of curing, some of bled oil is left on the mold surface. As the molding operation is repeated, such oil deposit contaminates the mold surface. If the molding step is further repeated without cleaning, stains will transfer to molded parts or the removal of parts from the mold is interfered, eventually resulting in such problems as inhibited removal due to adhesion of molded parts to the mold, damages on molded parts, detrimental influence on curing, and corrosion of the mold. To prevent such inconveniences, the mold must be periodically cleaned. In order to clean the mold which is used on-line, the mold must be detached from the molding machine, cooled down to room temperature, cleaned with chemical agents and solvents, mounted again in the molding machine, and allowed to stand until the mold temperature rises and stabilizes at the molding temperature. This also interferes with efficient production.

As mentioned above, the bleed oils commonly used in the prior art are silicone oils containing about 15 to 40 mol % of phenyl groups and having a viscosity of 100 to 500 centistokes. Those silicone oils which are likely to bleed out and facilitate removal of rubber parts from the mold, that is, low-viscosity, high phenyl content silicone oils cause more mold contamination. They do not satisfy both the requirements of smooth separation and least contamination.

JP-A 6-16938 discloses an oil-bleeding silicone rubber composition having blended therein a bleed oil containing specific amounts of hydroxyl and phenyl groups. JP-A 6-93186 discloses an oil-bleeding silicone rubber composition having blended therein two types of bleed oil. These compositions do not yet satisfy both the requirements of smooth separation and least contamination. These references indicate nowhere the characteristic component (C) of the present invention which is a bleed oil having methyl and phenyl groups attached to substantially all silicon atoms.

SUMMARY OF THE INVENTION

An object of the invention is to provide an oil-bleeding silicone rubber composition which when molded in a mold, satisfies both the requirements of least mold contamination and smooth release from the mold.

The inventors have found that by using as the bleed oil a silicone oil having methyl and phenyl groups attached to substantially all silicon atoms along with a conventional silicone bleed oil, a silicone rubber composition can be minimized in mold contamination and improved in mold release.

According to the invention, there is provided an oil-bleeding silicone rubber composition comprising (A) an organopolysiloxane of the following average compositional formula (1):

wherein $R^1$ is a substituted or unsubstituted monovalent hydrocarbon group, 0.0001 to 0.5 mol % of the hydrocarbon groups being alkenyl groups, and a is a positive number from 1.98 to 2.02, the organopolysiloxane having a degree of polymerization of at least 3,000, (B) finely divided silica having a specific surface area of at least 50 m²/g, (C) a silicone bleed oil of the following general formula (2):

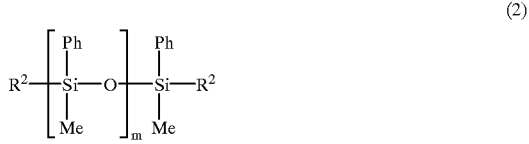

wherein $R^2$ is a hydroxyl group or a substituted or unsubstituted monovalent hydrocarbon group of 1 to 8 carbon atoms, Ph is phenyl, Me is methyl, and m is a positive number from 3 to 50, and (D) a silicone bleed oil represented by a structure other than component (C).

DESCRIPTION OF THE PREFERRED EMBODIMENT

Figure 1:
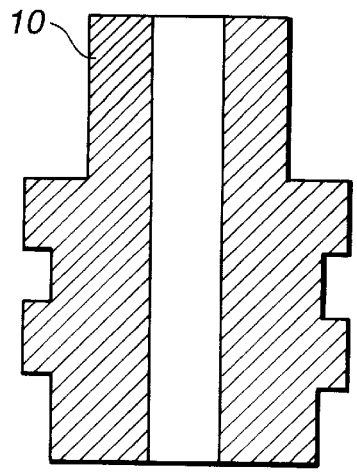
FIG. 1 is a cross-sectional view of a part to be molded in a mold release test.

Component (A) of the oil-bleeding silicone rubber composition according to the invention is an organopolysiloxane, generally referred to as a gum, of the following average compositional formula (1) having a degree of polymerization of at least 3,000.

$$R^1_a SiO_{(4-a)/2} \quad (1)$$

Herein $R^1$ is a substituted or unsubstituted monovalent hydrocarbon group, 0.0001 to 0.5 mol %, and preferably 0.01 to 0.3 mol %, of the hydrocarbon groups are alkenyl groups, and preferably vinyl groups, and letter a is a positive number from 1.98 to 2.02.

Specifically, exemplary groups represented by $R^1$ include alkyl groups such as methyl, ethyl and propyl, cycloalkyl groups such as cyclohexyl, alkenyl groups such as vinyl and allyl, aryl groups such as phenyl and tolyl, and substituted ones of the foregoing groups wherein some of the hydrogen atoms attached to carbon atoms are replaced by halogen atoms and cyano groups, such as chloromethyl and 3,3,3-trifluoropropyl. Of these, methyl, phenyl and 3,3,3-trifluoropropyl are preferred.

This organopolysiloxane is typically end blocked with hydroxyl groups or triorganosilyl groups such as trimethylsilyl, dimethylvinylsilyl, methyldivinylsilyl and trivinylsilyl. In order that the composition cure to silicone rubber of satisfactory strength, the organopolysiloxane should preferably have a viscosity of at least about 100,000 centistokes (cs) at 25° C., and especially about 1,000,000 to about 100,000,000 cs at 25° C.

Component (B) is a silica filler or finely divided silica. It should preferably have a specific surface area of at least 50 m²/g, and more preferably 100 to 400 m²/g, as measured by the BET method. Exemplary silica fillers are fumed silica, fired silica, precipitated silica and mixtures of any of these. The silica filler may have been surface treated with suitable agents such as linear organopolysiloxanes, cyclic organopolysiloxanes and hexamethyldisilazane. An appropriate amount of component (B) blended is about 5 to about 500 parts, and more preferably about 10 to about 50 parts by weight, per 100 parts by weight of the organopolysiloxane serving as component (A). With more or less amounts of the filler outside the range, the resulting silicone rubber composition would become difficult to work and cure to a mechanically weak product, that is, having unsatisfactory tensile strength and tear strength.

Component (C) of the inventive composition is a bleed oil in the form of a silicone oil having methyl and phenyl groups attached to substantially all silicon atoms. It is represented by the following general formula (2).

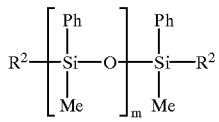

(2)

Herein $R^2$ is a hydroxyl group or a substituted or unsubstituted monovalent hydrocarbon group of 1 to 8 carbon atoms, Ph is phenyl. Me is methyl, and m is a positive number from 3 to 50.

Specifically, examples of the substituted or unsubstituted monovalent hydrocarbon group of 1 to 8 carbon atoms represented by $R^2$ include alkyl groups such as methyl, ethyl, propyl, butyl, and hexyl, cycloalkyl groups such as cyclohexyl, aryl groups such as phenyl and tolyl, aralkyl groups such as benzyl, and substituted ones of these wherein some or all of the hydrogen atoms are replaced by halogen atoms or the like. $R^2$ preferably represents hydroxyl, methyl and phenyl groups, and most preferably hydroxyl groups. The letter m is a positive number from 3 to 50, and especially from 3 to 10. No satisfactory mold release would be given if m is smaller than 3 or greater than 50.

Component (D) of the inventive composition is a silicone bleed oil which may be selected from known silicone oils commonly used in prior art oil-bleeding silicone rubber compositions. Illustrative are phenyl-containing silicone oils represented by a structure other than component (C), more specifically a silicone oil of the following general formula (3) having a viscosity of about 100 to 500 centipoise at 25° C. and a silicone oil of the following general formula (4). These may be used alone or in admixture.

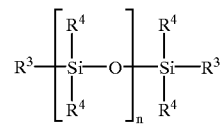

(3)

Herein $R^3$ is a hydroxyl group or a substituted or unsubstituted monovalent hydrocarbon group of 1 to 8 carbon atoms, $R^4$ is a substituted or unsubstituted monovalent hydrocarbon group, 15 to 40 mol % of the $R^4$ groups being phenyl groups, and n is a positive number of at least 3.

Examples of the monovalent hydrocarbon group represented by $R^3$ are the same as exemplified above for $R^2$. The monovalent hydrocarbon groups represented by $R^4$ are preferably those of 1 to 8 carbon atoms, examples of which are the same as exemplified above for $R^2$. Phenyl groups account for 15 to 40 mol % of the $R^4$ groups. The letter n is a positive number of at least 3, preferably 3 to 50, and more preferably 5 to 30.

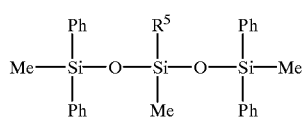

(4)

Herein $R^5$ is methyl, ethyl or phenyl, Ph and Me are as defined above.

The use of the bleed oil as component (C) along with the bleed oil as component (D) has the effect of minimizing mold contamination and facilitating mold release when the composition is molded in a mold. If component (C) is used alone, that is, without adding component (D), then the use of an oil-bleeding silicone rubber molded part encounters the inconvenient problem that the oil once bled out on the part surface is absorbed again within the part interior when the molded part is allowed to stand for a long time or a vulcanized part is subjected to secondary vulcanization. It is, therefore, preferred that component (D) is used in such amounts that oil will bleed on the molded part surface in an appropriate quantity causing no problem on use of oil-bleeding silicone rubber molded parts while the reminder of the necessary amount is component (C). The addition amount of component (C) and (D) combined is preferably 1.0 to 20 parts, and especially 3 to 15 parts by weight, per 100 parts by weight of the organopolysiloxane serving as component (A). Within this addition amount, preferably component (C) is 0.5 to 10 parts by weight and component (D) is 0.5 to 10 parts by weight. Less than 0.5 parts of component (D) would fail to exert a satisfactory bleeding effect. More than 20 parts of components (C) and (D) combined would induce declines of physical properties such as tensile strength and tear strength and cause the development of weld lines upon molding.

In addition to the above essential components, the oil-bleeding silicone rubber composition of the invention may contain any of additives depending on a particular application. Exemplary additives are dispersing agents such as silanol-containing, low-molecular weight dimethylsiloxanes having a degree of polymerization of up to 100, silanol-containing silanes, alkoxy-containing silanes, and hexaalkyldisilazanes; inorganic fillers such as diatomaceous earth, quartz flour, fused quartz flour, clay, alumina, and talc; heat resistance and oil resistance modifiers such as red iron oxide, titanium oxide, cerium oxide, zinc oxide, zinc carbonate, calcium carbonate, calcium hydroxide, magnesium carbonate, and magnesium oxide; pigments for coloring such as carbon black and ultramarine; parting agents, and other additives used in conventional silicone rubber compositions.

The oil-bleeding silicone rubber composition can be molded into any desired shape by conventional rubber molding techniques such as compression molding, transfer molding and injection molding. It is then vulcanized and cured in a conventional manner, obtaining molded parts. For vulcanization and curing, any of well-known curing techniques may be used, for example, the use of organic peroxide catalysts and hydrosilylation reaction based on organohydrogenpolysiloxane combined with platinum group catalysts.

Exemplary organic peroxides are benzoyl peroxide, tert-butyl perbenzoate, o-methylbenzyol peroxide, p-methylbenzyol peroxide, di-tert-butyl peroxide, dicumyl peroxide, 1,1-bis(tert-butyl peroxy)-3,3,5-trimethylcyclohexane, 2,5-dimethyl-2,5-di(tert-butyl peroxy)hexane, and 2,5-dimethyl-2,5-di(tert-butyl peroxy) hexyne. These peroxides may be used alone or in admixture. An appropriate amount of the organic peroxide blended is about 0.1 to about 5 parts by weight per 100 parts by weight of the silicone rubber composition.

The organohydrogenpolysiloxane used herein is an organopolysiloxane having at least two, preferably at least three SiH groups in a molecule. Typically it is of the following average compositional formula:

$$R^6_p H_q SiO_{(4-p-q)/2}$$

wherein $R^6$ is as defined for $R^1$, p and q are numbers satisfying $0 \leq p<3$, $0<q<3$, and $0<p+q<3$.

Exemplary of the organohydrogenpolysiloxane are methylhydrogenpolysiloxane, copolymers of methylhydrogenpolysiloxane and dimethylpolysiloxane, copolymers of methylhydrogenpolysiloxane and methylphenylpolysiloxane, copolymers of methylhydrogenpolysiloxane, dimethylpolysiloxane and diphenylpolysiloxane, and copolymers consisting of $(CH_3)_2HSiO_{1/2}$, $CH_3SiO_{3/2}$, $(CH_3)_2SiO$, and $SiO_2$ and generally having up to 400 silicon atoms in a molecule. The organohydrogenpolysiloxane is blended in such amounts that 0.5 to 3 mol of SiH groups are available per mol of alkenyl groups of the organpolysiloxane (A) in the silicone rubber composition. The platinum group catalysts include platinum black, chloroplatinic acid, alcohol-modified chloroplatinic acid, complex salts of chloroplatinic acid with ethylene or propylene, and complex salts of chloroplatinic acid with vinylsiloxane. The platinum group catalyst is blended in such amounts that 0.1 to 1,000 ppm of platinum metal is available in the silicone rubber composition.

The oil-bleeding silicone rubber composition of the invention is generally prepared by mixing components (A) to (D) in a conventional manner in such a mixer as a kneader, Banbury mixer or roll mill. Preferably the composition is prepared by first mixing components (A) and (B), optionally heat treating the mixture, and then adding components (C) and (D) thereto. The composition can be cured under the same conditions as used in conventional well-known crosslinking systems based on organic peroxides or addition reaction (hydrosilylation).

There has been described an oil-bleeding silicone rubber composition in which a silicone oil of formula (2) having methyl and phenyl groups attached to substantially all silicon atoms is used as the bleed oil along with a conventional silicone bleed oil. When molded in a mold, the composition causes minimized mold contamination and facilitates mold release.

EXAMPLE

Examples of the invention are given below by way of illustration and not by way of limitation. All parts are by weight.

Preparation Example

A silicone rubber compound, designated A, was prepared as follows. To 100 parts of an organopolysiloxane blocked with a dimethylvinylsilyl group at either end of its molecular chain, consisting of 98.875 mol % of $(CH_3)_2SiO$ units and 0.125 mol % of $(CH_2=CH)(CH_3)SiO$ units, and having a viscosity of 10,000,000 cs, were added 40 parts of precipitated silica (Nipsil LP by Nippon Silica K.K.) and 4 parts of dimethylpolysiloxane having a silanol group at either end, an average degree of polymerization of 13, and a viscosity of 15 cs as a dispersant. The mixture was uniformly kneaded, heat treated at 150° C. for 4 hours, and masticated and plasticized on a twin-roll mill, obtaining Silicone rubber compound A.

Examples 1–3 & Comparative Examples 1–6

In Silicone rubber compound A, bleed oils whose type and amount are shown In Table 1 and diatomaceous earth were blended on a twin-roll mill. Each of these blends, 100 parts, was blended with 0.4 part of 2,5-dimethyl-2,5-di(tert-butyl peroxy)hexane on the twin-roll mill. Seven compositions were obtained in this way.

Bleed oils A, B, C and D are phenyl group-containing polysiloxanes of the following average molecular or structural formulae:

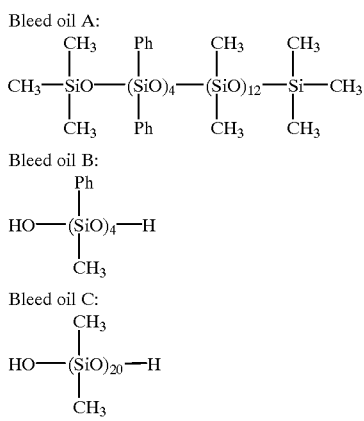

-continued

Bleed oil D:

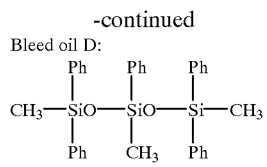

Diatomaceous earth is available under the trade name of Oplite W-3005S from Hokushu Keisodo K.K.

For these compositions, a mold release test and a mold contamination test were carried out and the degree of oil bleeding was examined.

Mold Release Test

Figure 2:
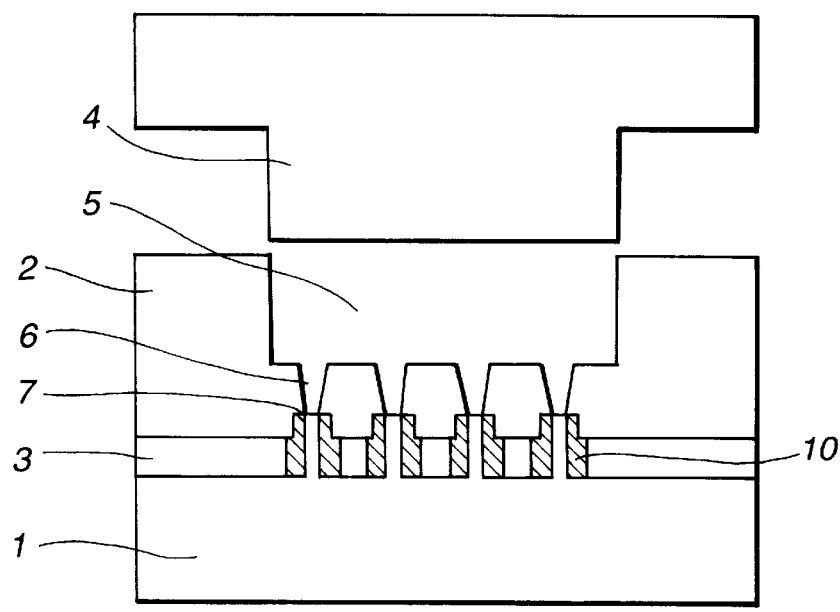
FIG. 2 is a schematic view of a transfer die casting machine for molding parts In the mold release test.
Figure 3:
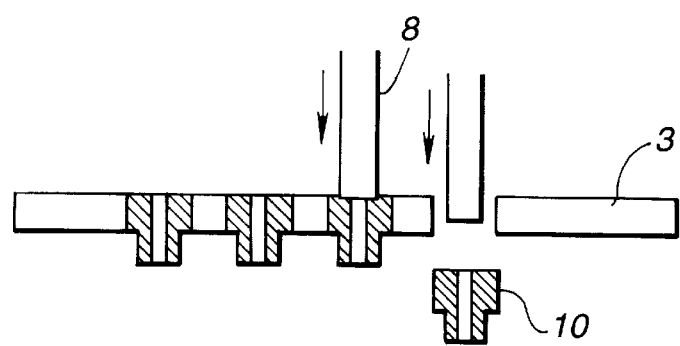
FIG. 3 is a schematic view showing the mold release test.

Molded parts of the hollow shape shown at 10 in FIG. 1 were molded from the composition using a transfer die casting machine having sixteen (16) mold cavities. As shown in FIG. 2, the molding machine included a lower mold section 1, an upper mold section 2, an insert 3, a piston 4, a pot 5, sprues 6, and ring gates 7. The composition was molded under pressure at 175° C. for 5 minutes. The mold was opened, and all the molded parts were removed from the mold while they were joined together by the insert 3. With the insert 3 held in place, ejector pins 8 were moved downward at a speed of 100 mm/min, as shown in FIG. 3, so as to eject the molded parts 10 from the insert 3. The force required for the ejector pin to knock out the molded part was determined. The number of molded parts which could not be ejected because the pin penetrated into the bore of the molded part was counted.

Mold Contamination Test

Using a compression mold, the composition was molded under pressure at 175° C. for 5 minutes to form disks having a diameter of 5 cm and a thickness of 2 mm. This molding operation was repeated 50 times before the mold cavity surface was observed for staining.

Degree of Oil Bleeding

The parts as molded in the mold contamination test and the parts which were subjected to secondary vulcanization at 200° C. for 4 hours were visually observed to see how oil was bled on the part surface.

Japanese Patent Application No. 10-216476 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. An oil-bleeding silicone rubber composition comprising (A) an organopolysiloxane of the following average compositional formula (1):

$$R^1{}_a SiO_{(4-a)/s} \qquad (1)$$

wherein $R^1$ is a substituted or unsubstituted monovalent hydrocarbon group, 0.0001 to 0.5 mol % of the hydrocarbon groups being alkenyl groups, and a is a positive number from 1.98 to 2.02, said organopolysiloxane having a degree of polymerization of at least 3,000, (B) finely divided silica having a specific surface area of at least 50 m²/g, (C) a silicone bleed oil of the following general formula (2):

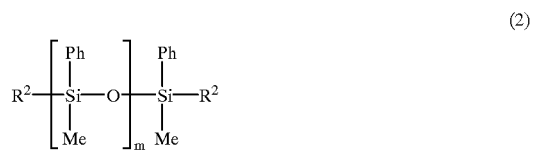

wherein $R^2$ is a hydroxyl group, Ph is phenyl, Me is methyl, and m is a positive number from 3 to 50, and (D) a silicone bleed oil represented by a structure other than component (C).

2. The oil-bleeding silicone rubber composition of claim 1 wherein component (D) is at least one of silicone bleed oils of the following general formulae (3) and (4):

TABLE 1

|  | Example | | | Comparative Example | | | | | |
|---|---|---|---|---|---|---|---|---|---|
|  | 1 | 2 | 3 | 1 | 2 | 3 | 4 | 5 | 6 |
| Silicone rubber compound A | 90 | 90 | 90 | 100 | 90 | 90 | 95 | 90 | 90 |
| Bleed oil A | 4 | — | — | — | 8 | — | 4 | — | — |
| Bleed oil B | 4 | 4 | 4 | — | — | 8 | — | — | — |
| Bleed oil C | — | 4 | — | — | — | — | — | — | — |
| Bleed oil D | — | — | 4 | — | — | — | — | 8 | 4 |
| Diatomaceous earth | 10 | 10 | 10 | — | 10 | 10 | 5 | 10 | 10 |
| Mold contamination test | little stained | little stained | not stained | not stained | stained | not stained | little stained | not stained | little stained |
| Mold release test | | | | | | | | | |
| Ejecting force (kgf) | 2.2 | 2.3 | 2.5 | 5.2 | 2.5 | 1.9 | 3.5 | 4.1 | 3.4 |
| Percent of unejected parts | 0 | 0 | 5 | 95 | 40 | 0 | 70 | 95 | 70 |
| Degree of oil bleeding | | | | | | | | | |
| As molded | good | good | good | — | good | good | good | good | good |
| After secondary vulcanization | good | good | good | — | good | poor | good | good | good |

It is evident from Table 1 that when oil-bleeding silicone rubber compositions within the scope of the invention are molded in a mold, the mold is little or not contaminated and the molded parts are effectively removed from the mold.

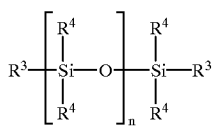

wherein $R^3$ is a hydroxyl group or a substituted or unsubstituted monovalent hydrocarbon group of 1 to 8 carbon atoms, $R^4$ is a substituted or unsubstituted monovalent hydrocarbon group, 15 to 40 mol % of the $R^4$ groups being phenyl groups, and n is a positive number of at least 3,

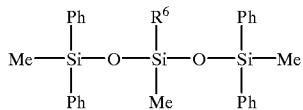

wherein $R^5$ is methyl, ethyl or phenyl, Ph is phenyl, and Me is methyl.

3. The oil-bleeding silicone rubber composition of claim 1 wherein the amount of components (C) and (D) combined is 1.0 to 20 parts by weight per 100 parts by weight of component (A).

4. An oil-bleeding silicone rubber composition according to claim 1, wherein $R^1$ is alkyl, cycloalkyl, alkenyl, or aryl, which in each case can be substituted by halogen, halogen atoms, cyano groups, or both.

5. An oil-bleeding silicone rubber composition according to claim 4, wherein $R^1$ is methyl, ethyl, propyl, cyclohexyl, vinyl, allyl, phenyl, tolyl, chloromethyl, or 3,3,3-trifluoropropyl.

6. An oil-bleeding silicone rubber composition according to claim 1, wherein the organopolysiloxane of formula (1) is end-blocked with groups selected from hydroxyl, trimethylsilyl, dimethylvinylsilyl, methyldivinylsilyl and trivinylsilyl.

7. An oil-bleeding silicone rubber composition according to claim 1 wherein the organopolysiloxane of formula (I) has a viscosity of at least 100,000 cs at 25° C.

8. An oil-bleeding silicone rubber composition according to claim 1, wherein component (B) is a finely divided silica having a surface area of 100–400 m²/g.

9. An oil-bleeding silicone rubber composition according to claim 1, wherein said finally divided silica is selected from fumed silica, fired silica, precipitated silica or mixtures thereof.

10. An oil-bleeding silicone composition according to claim 1, wherein the amount of component (B) is 5–500 parts per 100 parts by weight of component (A).

11. An oil-bleeding silicone composition according to claim 10, wherein the amount of component (B) is 10–50 parts per 100 parts by weight of component (A).

12. An oil-bleeding silicone rubber composition according to claim 1, wherein m is 3 to 10.

13. An oil-bleeding silicone rubber composition according to claim 2, wherein when $R^3$ is hydroxyl, alkyl having 1 to 8 carbon atoms which is optionally substituted by halogen atoms, cycloalkyl having up to 8 carbon atoms which is optionally substituted by halogen atoms, aryl having up to 8 carbon atoms which is optionally substituted by halogen atoms, or araalkyl having up to 8 carbon groups which is optionally substituted by halogen atoms, and $R^4$ is alkyl having 1 to 8 carbon atoms which is optionally substituted by halogen, cycloalkyl having up to 8 carbon atoms which is optionally substituted by halogen atoms, aryl having up to 8 carbon atoms which is optionally substituted by halogen atoms, or araalkyl having up to 8 carbon groups which is optionally substituted by halogen atoms.

14. An oil-bleeding silicone rubber composition according to claim 2, wherein n is 5 to 30.

15. An oil-bleeding silicone rubber composition according to claim 3, wherein the amount of components (C) and (D) combined is 3 to 15 parts by weight per 100 parts by weight of component (A).

16. An oil-bleeding silicone rubber composition according to claim 3, wherein the amount of component (C) is 0.5–10 parts by weight per 100 points of component (A) and the amount of compound (D) is 0.5–10 parts by weight per 100 parts by component (A).

17. An oil-bleeding silicone rubber composition according to claim 15, wherein the amount of component (C) is 0.5–10 parts by weight per 100 points of component (A) and the amount of compound (D) is 0.5–10 parts by weight per 100 parts by component (A).

18. The oil-bleeding silicone rubber composition of claim 10, wherein the amount of components (C) and (D) combined is 1.0 to 20 parts by weight per 100 parts by weight by component (A).

* * * * *